US012786349B2

(12) United States Patent
Ward et al.

(10) Patent No.: US 12,786,349 B2
(45) Date of Patent: Nov. 3, 2026

(54) VIDEOCONFERENCING BOOTH

(71) Applicant: DOLBY LABORATORIES LICENSING CORPORATION, San Francisco, CA (US)

(72) Inventors: Gregory John Ward, Berkeley, CA (US); Titus Marc DeVine, Shingle Springs, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 142 days.

(21) Appl. No.: 18/868,155

(22) PCT Filed: May 24, 2023

(86) PCT No.: PCT/US2023/023372
§ 371 (c)(1),
(2) Date: Nov. 21, 2024

(87) PCT Pub. No.: WO2023/230139
PCT Pub. Date: Nov. 30, 2023

(65) Prior Publication Data

US 2025/0330562 A1 Oct. 23, 2025

Related U.S. Application Data

(60) Provisional application No. 63/421,854, filed on Nov. 2, 2022, provisional application No. 63/345,127, filed on May 24, 2022.

(30) Foreign Application Priority Data

May 24, 2022 (EP) .................................... 22175095

(51) Int. Cl.
*H04N 7/14* (2006.01)
*G06F 3/01* (2006.01)
(Continued)

(52) U.S. Cl.
CPC ............. *H04N 7/142* (2013.01); *G06F 3/012* (2013.01); *H04L 65/403* (2013.01); *H04N 7/144* (2013.01);
(Continued)

(58) Field of Classification Search
None
See application file for complete search history.

(56) References Cited

U.S. PATENT DOCUMENTS 5,400,069 A 3/1995 Braun
5,808,792 A 9/1998 Woodgate
(Continued)

FOREIGN PATENT DOCUMENTS

GB 2353429 A 2/2001
WO 2020210937 A1 10/2020

OTHER PUBLICATIONS

David Nguyen et al, "MultiView: Improving Trust in Group Video Conferencing Through Spatial Faithfulness," Proceedings of the 2007 Conference on Human Factors in Computing Systems, CHI 2007, San Jose, California, USA, Apr. 28-May 3, 2007 10 pages.
(Continued)

*Primary Examiner* — Quoc D Tran

(57) ABSTRACT

A videoconferencing booth (100) and operating method therefor. The videoconferencing booth (100) comprises a tracking system (106), a stereoscopic projector (104), a first actuator (114) configured to translate the stereoscopic projector (104), an image sensor arrangement (108), a second actuator (118) configured to translate the image sensor arrangement (108), and a controller (202). The controller (202) is configured to obtain a first stream of first positions from the tracking system (106), transmit commands to the first actuator (114) to adjust the position of the stereoscopic projector (104) based on the first stream of first positions,
(Continued)

and transmit the first stream of first positions to a remote videoconferencing booth. The controller (202) is further configured to receive, from the remote videoconferencing booth, a second stream of second positions and transmit commands to the second actuator (118) to adjust the position of the image sensor arrangement (108) based on the second stream of second positions.

14 Claims, 8 Drawing Sheets

(51) Int. Cl.

| | |
|---|---|
| ***H04L 65/403*** | (2022.01) |
| ***H04N 7/15*** | (2006.01) |
| ***H04N 13/302*** | (2018.01) |
| ***H04N 13/363*** | (2018.01) |
| ***H04N 13/366*** | (2018.01) |

(52) U.S. Cl.
CPC ............ *H04N 7/15* (2013.01); *H04N 13/302* (2018.05); *H04N 13/363* (2018.05); *H04N 13/366* (2018.05)

(56) References Cited

U.S. PATENT DOCUMENTS

| | | | | |
|---|---|---|---|---|
| 5,815,197 | A | 9/1998 | Kakii | |
| 5,872,590 | A | 2/1999 | Aritake | |
| 6,724,417 | B1 | 4/2004 | Hillis | |
| 6,798,457 | B2 | 9/2004 | Boyden | |
| 6,806,898 | B1 | 10/2004 | Toyama | |
| 7,136,090 | B1 * | 11/2006 | McDuffie White .... | H04N 7/144 348/E13.058 |
| 8,299,979 | B2 | 10/2012 | Rambo | |
| 9,253,442 | B1 | 2/2016 | Pauli | |
| 10,477,149 | B2 | 11/2019 | Smits | |
| 10,554,921 | B1 * | 2/2020 | Lim .......................... | G06T 7/50 |
| 10,582,153 | B2 * | 3/2020 | Horio ..................... | H04N 23/90 |
| 2003/0035001 | A1 | 2/2003 | Van Geest | |
| 2006/0181607 | A1 | 8/2006 | Mcnelley | |
| 2012/0169838 | A1 | 7/2012 | Sekine | |
| 2012/0229592 | A1 * | 9/2012 | White ...................... | H04N 7/15 348/E7.083 |
| 2013/0155176 | A1 * | 6/2013 | Paripally ................ | H04N 7/144 348/14.07 |
| 2016/0004302 | A1 * | 1/2016 | Bolle ...................... | G06F 3/013 348/14.08 |
| 2017/0163937 | A1 | 6/2017 | Mcnelley | |
| 2020/0344500 | A1 | 10/2020 | Goldman | |

OTHER PUBLICATIONS

David Nguyen et al, "MultiView: Spatially Faithful Group Video Conferencing," Proceedings of the 2005 Conference on Human Factors in Computing Systems, CHI 2005, Portland, Oregon, USA, Apr. 2-7, 2005, 10 pages.
David Sirkin et al, "Motion and Attention in a Kinetic Videoconferencing Proxy," Lecture Notes in Computer Science, 6946:162-180, DOI 10.1007/978-3-342-23774-4_16, INTERACT 2011—13th IFIP TC 13 International Conference, Sep. 2011, 18 pages.
Hong Hua et al, "Imaging properties of retro-reflective materials used in head-mounted projective displays (HMPDs)," Proceedings of SPIE, Proc. SPIE 4711, Helmet- and Head-Mounted Displays VII, Aug. 5, 2002, doi: 10.1117/12.478871, 9 pages.
Jason Geng: "Three-dimensional display technologies", Advances in Optics and Photonics, vol. 5, No. 4, Nov. 22, 2013 (Nov. 22, 2013), pp. 456-535, 80 pages.
Jason Lawrence et al, "Project Starline: A high-fidelity telepresence system," ACM Trans. Graph., vol. 40, No. 6, Article 242. Publication date: Dec. 2021, 16 pages.
Peter Lincoln et al, "Multi-view lenticular display for group teleconferencing," Article . Jan. 2009, https://www.researchgate.net/publication/234797834, DOI: 10.4108/immerscom.2009.23, 9 pages.
Phil Surman et al, "Head tracked retroreflecting 3D display," Journal of the SID, DOI# 10.1002/jsid.295, Mar. 27, 2015, 13 pages.
Roel Vertegaal et al, "GAZE-2: Conveying eye contact in group video conferencing using eye-controlled camera direction," Conference Paper • Jan. 2003, DOI: 10.1145/642611.642702 • Source: DBLP, 9 pages.
Timothy Raymond Brick et al, "High-presence, low-bandwidth, apparent 3D video-conferencing with a single camera," Conference Paper • May 2009, DOI: 10.1109/WIAMIS.2009.5031494 • Source: DBLP, 5 pages.

* cited by examiner

VIDEOCONFERENCING BOOTH

CROSS-REFERENCE TO RELATED APPLICATIONS

This application is the U.S National stage entry of International Patent Application No. PCT/US2023/023372 filed May 24, 2023, which claims the benefit of priority from U.S. Provisional Patent Application No. 63/345,127, filed on May 24, 2022, U.S. Provisional Patent Application No. 63/421,854 filed on Nov. 2, 2022, and European Patent Application No. 22175095.3 filed on May 24, 2022, each of which is incorporated by reference in its entirety.

BACKGROUND

1. Field of the Disclosure

This application relates generally to systems and methods for video conferencing.

2. Description of Related Art

Virtual meetings, such as video conferences, are commonly conducted from personal offices and conference rooms, allowing for participants to meet virtually from different locations. Conferencing systems include, for example, a display, speakers, cameras, and microphones that allow participants to see and communicate with other participants. Participants in the virtual meeting see other participants via the display.

GB 2 353 429 A discloses an arrangement for displaying a life-size live image of a person from a remote location in a three dimensional setting in a home location while providing the person in the remote location with a corresponding telepresence of the home location. The arrangement comprises a video presentation system for displaying a person on a black or chromakey background; a two way mirror for viewing both a setting and the superimposed video image of the person; a video camera or pair of cameras positioned in line with the eyes of the superimposed image of the person; and a network connection between the home location and the remote location. Stereoscopic views may be used with the two way mirror and a retroreflective surface to display life-size autostereoscopic live images of a person from a remote location in a 3D setting. A further arrangement includes a device that allows for tracking of the eyes of the user.

BRIEF SUMMARY OF THE DISCLOSURE

While virtual meetings provide for face-to-face meeting experience, displays used in traditional virtual meeting settings only provide for two-dimensional imaging. Accordingly, participants in the virtual meeting do not sense the presence of others and may still experience a social disconnect with other participants in the virtual meeting.

Embodiments described herein relate to a videoconferencing booth. The videoconferencing booth aims to provide for a sense of an in-person meeting, may avoid a need for glasses to provide three-dimensional imagery, and may reduce or minimize reflections and barriers of screens. Additionally, three-dimensional systems with full parallax generally require complex three-dimensional scene sensing, image compression algorithms, and image reconstruction algorithms that require a considerable amount of computation and bandwidth requirements. Embodiments described herein provide for a three-dimensional videoconferencing booth that may use mechanical components, such as actuators, to match views between participants. As components are moved mechanically based on tracked head and/or facial motion, the system may use only stereo video streams, and relatively small amounts of metadata are needed for computations.

In one exemplary aspect of the present disclosure, there is provided a videoconferencing booth, comprising: a tracking system configured to track a position of a first user, a stereoscopic projector; a first actuator configured to translate the stereoscopic projector along at least a first axis; an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth; a second actuator configured to translate the image sensor arrangement along at least a second axis; and a controller configured to: obtain a first stream of first positions of the first user from the tracking system, transmit commands to the first actuator to adjust the position of the stereoscopic projector along the first axis based on the first stream of first positions of the first user, transmit the first stream of first positions of the first user to the remote videoconferencing booth, receive, from the remote videoconferencing booth, a second stream of second positions of the second user of the remote videoconferencing booth, transmit commands to the second actuator to adjust the position of the image sensor arrangement along the second axis based on the second stream of second positions of the second user, receive, from the remote videoconferencing booth, a video stream corresponding to the left eye of the second user and a video stream corresponding to the right eye of the second user, wherein each of the received video streams of the second user includes at least a given frame that was captured based on the first user being at a third position, determine, based at least in part on the first stream of first positions of the first user from the tracking system, that the first user is located at a fourth position at the time of receiving the given frame of the video stream, estimate an error between the third position of the first user and the fourth position of the first user, and adjust the video stream corresponding to the left eye of the second user and the video stream corresponding to the right eye of the second user based on the estimated error.

In another exemplary aspect of the present disclosure, there is provided a method for operating a videoconferencing booth, the videoconferencing booth including a tracking system configured to track a position of a first user, a stereoscopic projector, a first actuator configured to translate the stereoscopic projector along at least a first axis, an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth, and a second actuator configured to translate the image sensor arrangement along at least a second axis, the method comprising: obtaining a first stream of first positions of the first user from the tracking system, transmitting commands to the first actuator to adjust the position of the stereoscopic projector along the first axis based on the first stream of first positions of the first user, transmitting the first stream of first positions of the first user to the remote videoconferencing booth, receiving, from the remote videoconferencing booth, a second stream of second positions of the second user of the remote videoconferencing booth, transmitting commands to the second actuator to adjust the position of the image sensor arrangement along the second axis based on the second stream of second positions of the second user, receiving, from the remote videoconferencing booth, a video stream corresponding to the left eye of the second user and a video stream corresponding to the right eye of the second user, wherein each of the received video streams of the second user includes at least a given frame that was captured based on the first user being at a third position, determining, based at least in part on the first stream of first positions of the first user from the tracking system, that the first user is located at a fourth position at the time of receiving the given frame of the video stream, estimating an error between the third position of the first user and the fourth position of the first user, and adjusting the video stream corresponding to the left eye of the second user and the video stream corresponding to the right eye of the second user based on the estimated error.

In another exemplary aspect of the present disclosure, there is provided a non-transitory computer-readable medium storing instructions that, when executed by a processor of a projection system in a videoconferencing booth according to the present disclosure, cause the projection system to perform operations comprising: obtaining a first stream of first positions of the first user from the tracking system, transmitting commands to the first actuator to adjust the position of the stereoscopic projector along the first axis based on the first stream of first positions of the first user, transmitting the first stream of first positions of the first user to a remote videoconferencing booth, receiving, from the remote videoconferencing booth, a second stream of second positions of a second user of the remote videoconferencing booth, and transmitting commands to the second actuator to adjust the position of the image sensor arrangement along the second axis based on the second stream of second positions of the second user.

In another exemplary aspect of the present disclosure, there is provided a videoconferencing table comprising a tracking system configured to track positions of a first local user and a second local user, a first image sensor arrangement configured to capture at least the first local user, a second image sensor arrangement configured to capture at least the second local user, a first actuator configured to translate the first image sensor arrangement along at least a first axis, a second actuator configured to translate the second image sensor arrangement along at least a second axis, and a controller. The controller is configured to receive a first stream of first positions of a first remote user and transmit commands to the first actuator to adjust the position of the first image sensor arrangement along the first axis based on the first stream of first positions of the first remote user. The controller is configured to receive a second stream of second positions of a second remote user, and transmit commands to the second actuator to adjust the position of the second image sensor arrangement along the second axis based on the second stream of second positions of the second remote user. The first image sensor arrangement comprises a first image sensor of the first image sensor arrangement and a second image sensor of the first image sensor arrangement. The first image sensor of the first image sensor arrangement is configured to generate a video stream corresponding to a left eye of a user of a remote videoconferencing booth and the second image sensor of the first image sensor arrangement is configured to generate a video stream corresponding to a right eye of the user of the remote videoconferencing booth. The second image sensor arrangement comprises a first image sensor of the second image sensor arrangement and a second image sensor of the second image sensor arrangement. The first image sensor of the second image sensor arrangement is configured to generate a video stream corresponding to the left eye of the user of the remote videoconferencing booth and the second image sensor of the second image sensor arrangement is configured to generate a video stream corresponding to the right eye of the user of the remote videoconferencing booth.

In another exemplary aspect of the present disclosure, there is provided a method for operating a videoconferencing table, the videoconferencing table including a tracking system configured to track positions of a first local user and a second local user, a first image sensor arrangement configured to capture at least the first local user, a second image sensor arrangement configured to capture at least the second local user, a first actuator configured to translate the first image sensor arrangement along at least a first axis, and a second actuator configured to translate the second image sensor arrangement along at least a second axis. The method includes receiving a first stream of first positions of a first remote user and transmitting commands to the first actuator to adjust the position of the first image sensor arrangement along the first axis based on the first stream of first positions of the first remote user. The method includes receiving a second stream of second positions of a second remote user and transmitting commands to the second actuator to adjust the position of the second image sensor arrangement along the second axis based on the second stream of second positions of the second remote user. The first image sensor arrangement comprises a first image sensor of the first image sensor arrangement and a second image sensor of the first image sensor arrangement. The first image sensor of the first image sensor arrangement is configured to generate a video stream corresponding to a left eye of a user of a remote videoconferencing booth and the second image sensor of the first image sensor arrangement is configured to generate a video stream corresponding to a right eye of the user of the remote videoconferencing booth. The second image sensor arrangement comprises a first image sensor of the second image sensor arrangement and a second image sensor of the second image sensor arrangement. The first image sensor of the second image sensor arrangement is configured to generate a video stream corresponding to the left eye of the user of the remote videoconferencing booth and the second image sensor of the second image sensor arrangement is configured to generate a video stream corresponding to the right eye of the user of the remote videoconferencing booth.

In another exemplary aspect of the present disclosure, there is provided a videoconferencing booth comprising a tracking system configured to track a position of a first user, a wearable stereoscopic projector, an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth, an actuator configured to translate the image sensor arrangement along at least a first axis, and a controller. The controller is configured to obtain a first stream of first positions of the first user from the tracking system, transmit the first stream of first positions of the first user to the remote videoconferencing booth, receive, from the remote videoconferencing booth, a second stream of second positions of the second user of the remote videoconferencing booth, and transmit commands to the actuator to adjust the position of the image sensor arrangement along the first axis based on the second stream of second positions of the second user.

In this manner, various aspects of the present disclosure provide for the capturing and display of images and motion tracking and effect improvements in at least the technical fields of image projection, image display, motion tracking, three-dimensional imaging, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Videoconferencing Booth Configuration

Figure 1:
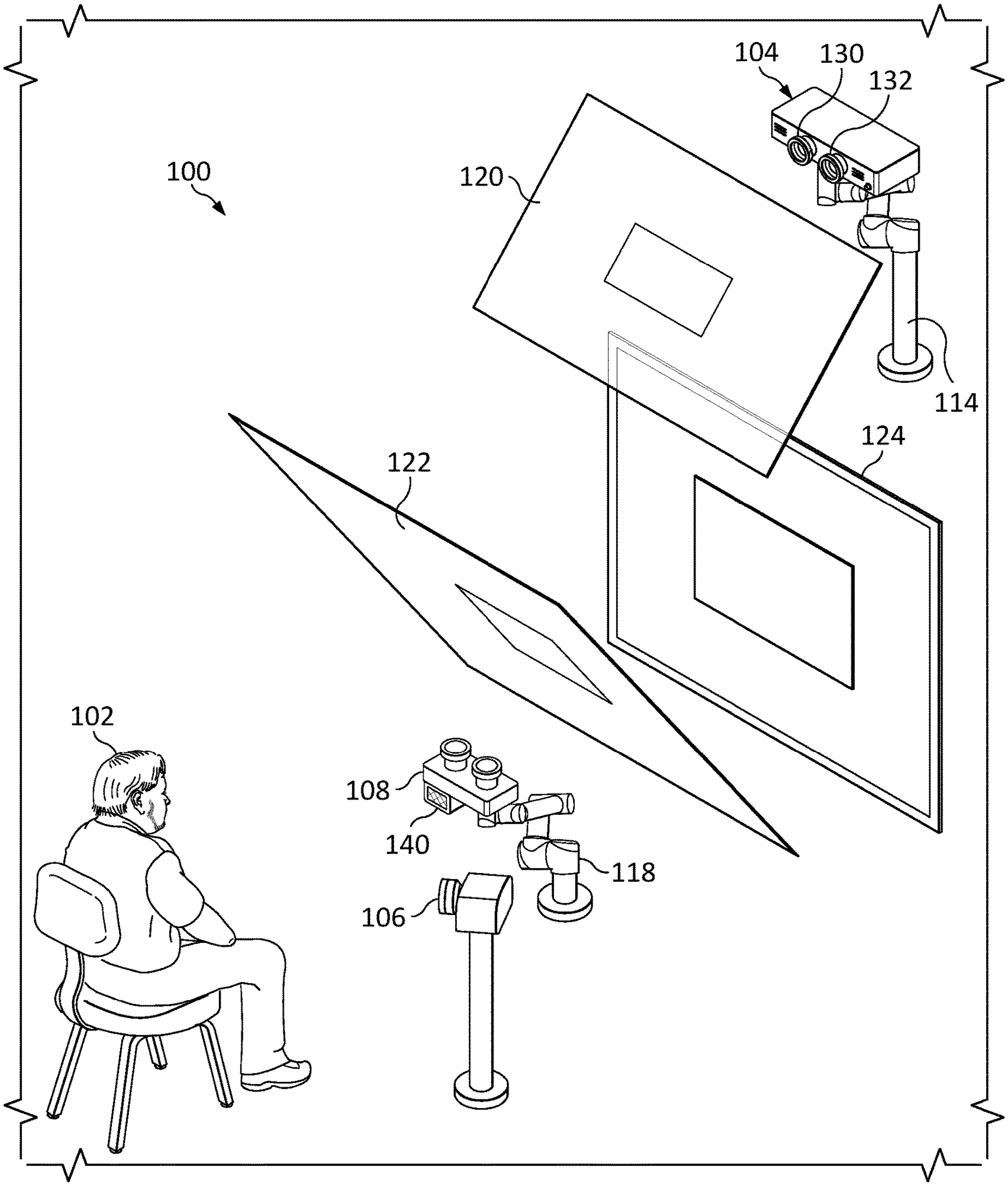
FIG. 1 depicts an example videoconferencing booth.

FIG. 1 illustrates an example videoconferencing booth (100). A user (102) (e.g., a first user) is within the videoconferencing booth (100). The videoconferencing booth (100) includes a projector (104), a tracking system (106), and an image sensor arrangement (108) (e.g., a camera). In FIG. 1, the projector (104) is a stereoscopic projector that projects a first image (130) and a second image (132), each image corresponding to an eye of the user (102). For example, the first image (130) may correspond to a left eye image, and the second image (132) may correspond to a right eye image. The stereoscopic projection provides for a three-dimensional (3-D) viewing experience by the user (102). In some embodiments, the projector (104) is a pico-projector. In some embodiments, the image sensor arrangement (108) is a high dynamic range (HDR) camera and the projector (104) is a HDR projector. Additionally, in some instances, rather than a single projector (104) projecting the first image (130) and the second image (132) from a same projector housing, two separate projectors may be implemented. Accordingly, a first projector projects the first image (130), and the second projector projects the second image (132).

In the example illustrated by FIG. 1, the projector (104) projects the first image (130) and the second image (132) towards a mirror (120). The mirror (120) reflects the first image (130) and the second image (132) towards a splitter (122) (e.g., a beamsplitter). In some embodiments, the splitter (122) is a polarized splitter (122) (e.g., a polarizing beamsplitter) that reflects light waves of a particular polarization, while blocking (or allowing to pass through) light of other polarizations. Light of the first image (130) and the second image (132) reflected by the splitter (122) is reflected towards a screen (124). In some configurations, the splitter (122) is directly between the user (102) and the screen (124). Accordingly, to allow the user (102) to view the first image (130) and the second image (132) on the screen (124) in such a configuration, the splitter (122) may be a two-way splitter (122). In this manner, the presence of the splitter (122) is not noticeable to the user (102). In some implementations, rather than including the mirror (120), the first image (130) and the second image (132) are directly projected onto the splitter (122). Additionally, in some instances, a polarizing filter is optically downstream of the projector (104) such that the splitter (122) reflects light from the projector (104). The polarizing filter may be integrated within, or is otherwise part of, the projector (104).

By projecting both the first image (130) and the second image (132) onto the screen (124), the screen (124) provides for a stereoscopic image. This provides for a seemingly three-dimensional experience for the user (102), as the image viewed on the screen (124) provides an impression of depth. In some implementations, the screen (124) is a retro-reflective screen (124). Accordingly, the screen (124) may reflect light back in the direction in which it was projected onto the screen (124) (i.e., towards the splitter (122)). The splitter (122) permits the light reflected by the screen (124) to pass through towards the user (102). Accordingly, the first image (130) is provided to a right eye of the user (102), and the second image (132) is provided to a left eye of the user (102). As the first image (130) and the second image (132) are provided directly to the user (102) and perpendicularly from the screen (124), use of polarized or spectrally-selective eyewear, which may typically be needed within a 3-D viewing system, is avoided. In some embodiments, the screen (124) includes a quarter-wave plate configured to "twist" the polarized light from the splitter (122) and reduce secondary reflections. Because the light is twisted by the quarter-wave plate, polarized light is able to pass through the splitter (122) to the user (102). More specifically, in implementations including the quarter-wave plate and the polarizing filter, the polarizing filter in front of or implemented within the projector (104) applies a first polarization such that the light reflects off of the splitter (122). The quarter-wave plate then "twists" the light into a second polarization such that the light passes through the splitter (122) towards the user (102).

While the user (102) is participating in a videoconference and viewing the screen (124), the image sensor arrangement (108) captures an image or video of the user (102) that is provided to a remote videoconferencing booth, as discussed below in more detail. In some embodiments, the image sensor arrangement (108) directly captures the user (102). In some embodiments, the image sensor arrangement (108)

receives light (e.g., a reflection) of the user (102) from the splitter (122). While the image sensor arrangement (108) is illustrated as a stereoscopic image sensor arrangement (108) providing two image sensor arrangements within a same housing, the videoconferencing booth (100) may include additional or separate image sensors, such as an image sensor arrangement (108) comprising a pair of image sensors with separate housings. Each image sensor within the pair of image sensors of the image sensor arrangement (108) may correspond to an eye of a remote user. For example, a first image sensor arrangement generates a video stream corresponding to a left eye, and a second image sensor arrangement generates a video stream corresponding to a right eye. In some instances, a polarizer is attached to (or integrated within) a lens of each image sensor of the image sensor arrangement (108) to reduce residual transmission from the projector (104).

Additionally, a tracking system (106) tracks head and facial movement of the user (102). In some instances, the tracking system (106) is an infrared or near-infrared tracking system (106). In such an instance, a light source may be implemented and projected onto the user (102) to aid in depth determination. In one example, the infrared tracking system (106) uses markers, such as reflective markers coupled to the user (102), to track movement of the user (102). In another example, the tracking system (106) is configured to track movement of the user (102) using eye tracking algorithms, facial tracking algorithms, and other algorithms which may be machine-learned algorithms. The image sensor arrangement (108), the tracking system (106), and the projector (104) may each be coupled to a sensor actuator (118), a tracking actuator (116), and a projector actuator (114), respectively, as described below in more detail.

In some embodiments, the videoconferencing booth (100) further includes microphones and speakers (e.g., spatial audio devices) for conveying audio data. For example, a microphone within the videoconferencing booth (100) captures audio provided by the user (102) and converts the audio into data to be transmitted to a remote videoconferencing booth. Additionally, when in a videoconference, the speaker outputs data received from a remote videoconferencing booth. To reproduce sound such that it appears to emanate from the remote participant's location (e.g., from the remote participant themselves), the speaker may be implemented within the image sensor arrangement (108) (illustrated as speaker 140 in FIG. 1). In other instances, a surround-sound system comprising a plurality of speakers is used to emulate the sound. In some instances, a speaker may be implemented behind the screen (124). In such an instance, the screen (124) is acoustically transparent.

In some implementations, a wearable stereoscopic projector is worn by the user (102), replacing the projector (104). For example, the wearable stereoscopic projector may be glasses or glasses frames including small projectors embedded in the left and right sides of the frames. The wearable stereoscopic projector projects a left-eye image and a right-eye image onto the retro-reflective screen (124). The screen (124) reflects the left-eye image into the left eye of the user (102) and the right-eye image into the right eye of the user (104). While the wearable stereoscopic projector may be configured as glasses, the glasses may not necessarily be polarized or spectrally-selective eyewear. Rather, the glasses may be only glasses frames (e.g., lacking any glass or lens). In further embodiments, the user (102) may wear augmented-reality (AR) glasses (replacing the projector (104) and the wearable stereoscopic projector) configured to provide a three-dimensional image of a remote participant. In such implementations, components such as the mirror (120) and the projector (104), and the associated components, may be omitted.

Figure 2:
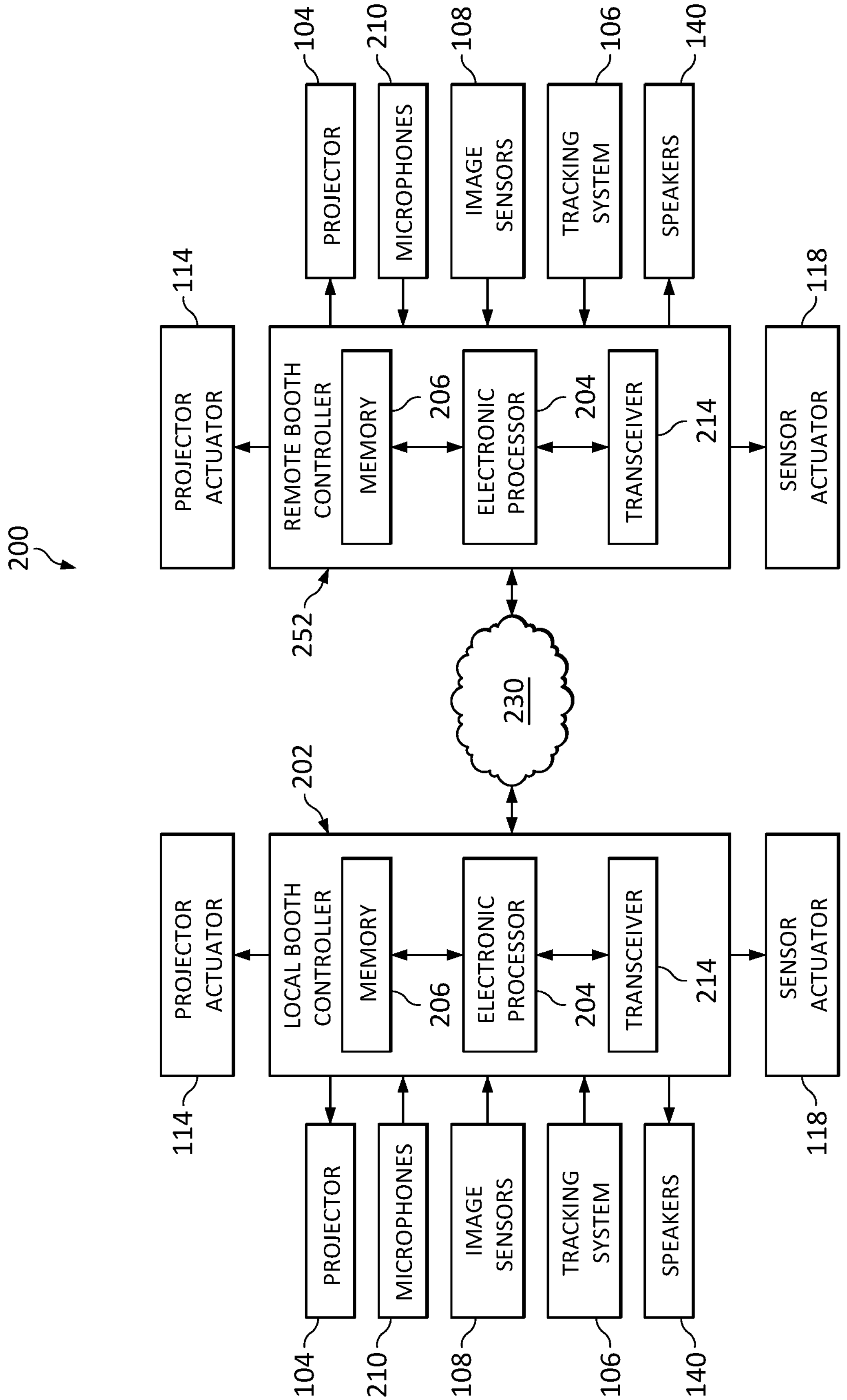
FIG. 2 depicts an example control system for the videoconferencing booth of FIG. 1.

A videoconference typically involves multiple participants. Accordingly, the videoconferencing booth (100) may transmit audio data, video data, and operational data to a second, remote videoconferencing booth during a videoconference. FIG. 2 provides an example videoconferencing system (200) for controlling multiple videoconferencing booths (100). The example of FIG. 2 provides for a local videoconferencing booth controller (202) (e.g., a local controller) and a remote videoconferencing booth controller (252) (e.g., a remote controller), each controlling a local videoconferencing booth and a remote videoconferencing booth, respectively. However, in other instances, additional videoconferencing booths may be included. The local controller (202) and the remote controller (252) include substantially similar components.

The local controller (202) includes, among other things, an electronic processor (204), a memory (206), and a transceiver (214). The electronic processor (204), the memory (206), and the transceiver (214) communicate over one or more control and/or data buses. FIG. 2 illustrates only one example of the local controller (202). The local controller (202) may include more or fewer components and may perform functions other than those explicitly described herein. In some examples, the electronic processor (204) is implemented as a microprocessor with separate memory (206). In other examples, the electronic processor (204) is implemented as a microcontroller, where the memory (206) is on the same chip. The electronic processor (204) may be implemented with multiple processors, and may be implemented partially or entirely as, for example, a field-programmable gate array (FPGA) or an applications specific integrated circuit (ASIC).

The memory (206) includes non-transitory, computer-readable memory that stores instructions that are received and executed by the electronic processor (204) to carry out the functionality of the videoconferencing booth (100) described herein. The memory (206) may include, for example, combinations of different types of memory, such as read-only memory and random-access memory.

The transceiver (214) allows the local controller (202) to perform wired and/or wireless communications with the remote controller (252) over a network (230). The network (230) may be, for example, a Long-Term Evolution (LTE) network, a Bluetooth™ network, a Wi-Fi network, or other similar communication networks. The transceiver (214) may also handle communication with various components and devices of the videoconferencing booth (100) connected to the local controller (202), such as the projector (104), the tracking system (106), the image sensor arrangement (108), microphones (210), speakers (140), the projector actuator (114), and the sensor actuator (118).

The local controller (202) receives and transmits data from connected components operate the videoconferencing booth (100). For example, the local controller (202) receives image and/or video of the user (102) from the image sensor arrangement (108). The local controller (202) receives tracking information regarding head and/or facial movements of the user (102) from the tracking system (106). Additionally, the local controller (202) receives audio data including speech and other audio present within the videoconferencing booth (100) from the microphones (210). The video of the user (102), the tracking information, and the audio data are provided to the remote controller (252) via the network (230). The tracking information associated with the user (102) may also be used to control the projector actuator (114), as described below in more detail.

The local controller (202) receives similar image and/or video data, tracking information, and audio data related to a remote user (not shown) from the remote controller (252). The received audio data is output using the speakers (212). The image and/or video data is output using the projector (104). The tracking information associated with the remote user may be used to control the sensor actuator (118), as described below in more detail.

Methods of Operating the Videoconference Booth

Figure 3:
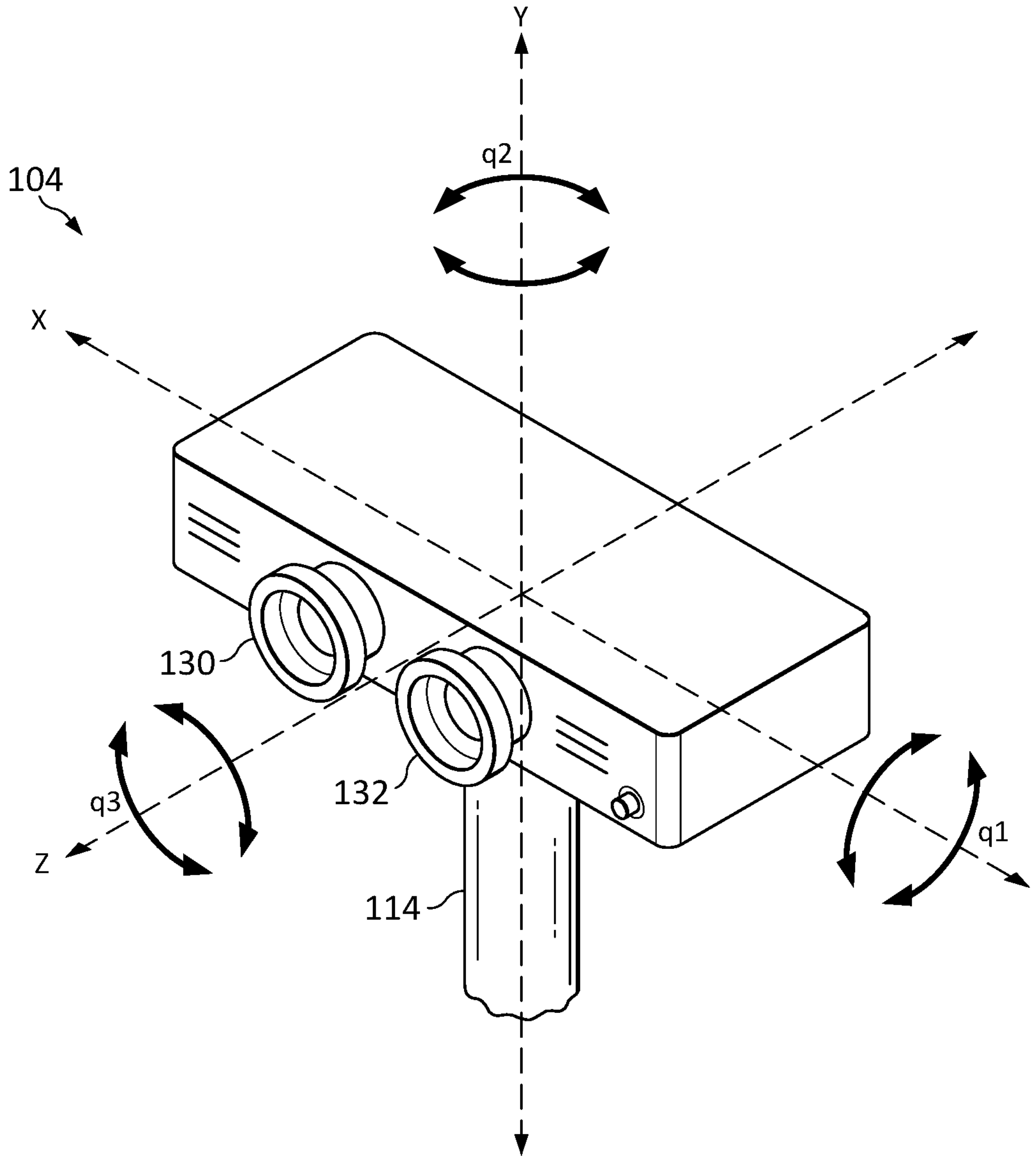
FIG. 3 depicts an example camera.

To enhance the stereoscopic experience of the user (102), the local controller (202) controls the projector actuator (114), and the sensor actuator (118) to move the projector (104), and the image sensor arrangement (108), respectively. For example, FIG. 3 illustrates the projector (104) coupled to the projector actuator (114). The projector actuator (114) is configured to move the projector (104) along at least one of a first axis (X) (e.g., an X-axis), a second axis (Y) (e.g., a Y-axis), and a third axis (Z) (e.g., a Z-axis). In some implementations, the projector actuator (114) is also configured to twist and turn the projector (104) along at least one of a fourth axis (θ1), a fifth axis (θ2), and a sixth axis (θ3). While only the projector (104) is shown, the image sensor (108) may be configured to be moved in the same manner via the sensor actuator (118). The actuators may be, for example, robotic arms configured to move with several degrees of freedom (e.g., up to 6 degrees of freedom). The axes chosen for translating and/or rotating the projector (104) and/or the image sensor arrangement (108) depend on (i) the chosen quality for enhancing the stereoscopic experience of the user (102) and (ii) the axes along the user (102) has a certain degree of freedom to move. While best stereoscopic experience can be expected when translating along three axes and rotating around three further axes, it might be reasonable to limit the axes for translation and/or rotation to those ones where the user (102) to be tracked has sufficient freedom to move. For example, in a setting where the user (102) is sitting on a chair and the user's movements are limited to head movements mainly along a horizontal axis, it might even be sufficient to provide a translation of the projector and the image sensor arrangement along the horizontal axis. Clearly, any further axis provided for translating and rotating the projector and the image sensor arrangement will improve the stereoscopic experience. However, it is a trade-off between increased quality and reduced complexity whether to provide translation along a particular axis or rotation around a particular axis in which the user has only a limited degree of freedom to move. As a result, the present invention may be implemented by using various numbers of axes for translation and/or rotation.

Figure 4:
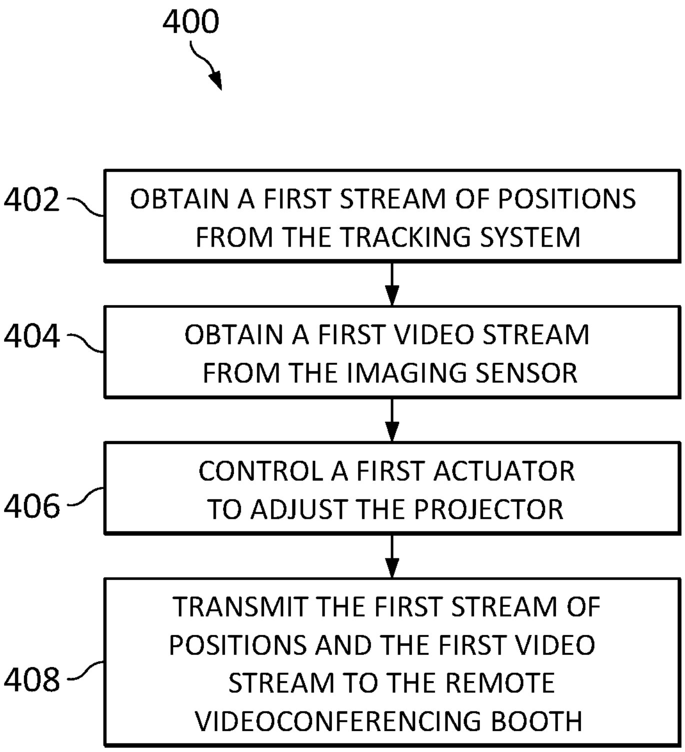
FIG. 4 depicts an example method conducted by the control system of FIG. 2.

To maintain a clear stereoscopic, three-dimensional image as the user (102) moves their head and face, the local controller (202) adjusts the position of the projector (104) based on tracked movement provided by the tracking system (106). By adjusting the position of the projector (104) in this manner, the first image (130) and the second image (132) can be provided to the respective left and right eyes of the user (102), even as the user (102) moves around. FIG. 4 provides a method (400) for controlling components of the videoconferencing booth (100) based on movement of the user (102). The method (400) may be performed by, for example, the local controller (202) or the remote controller (252). Additionally, the steps provided within FIG. 4 are merely examples, and may instead be conducted in a different order or simultaneously.

At step (402), the local controller (202) obtains a first stream of positions from the tracking system (106). For example, as the user (102) talks or otherwise moves their head and face during a videoconferencing meeting, the tracking system (106) monitors the movement of the local user (102). The tracking system (106) then transmits the moving position of the user (102) to the local controller (202).

At step (404), the local controller (202) obtains a first video stream from the image sensor arrangement (108). For example, as the user (102) conducts the videoconference, the image sensor arrangement (108) captures the user (102) via picture and/or video. The image sensor arrangement (108) provides the captured image and/or video to the local controller (202).

At step (406), the local controller (202) controls a first actuator to adjust the projector (104). For example, as the head position of the local user (102) changes, the first image (130) and the second image (132) may no longer align with the eyes of the user (102) when reflected by the screen (124). Accordingly, to maintain proper eye contact and ensure the quality of the video remains consistent, the local controller (202) controls the projector actuator (114) to adjust the position of the projector (104). The projector actuator (114) may move the projector (104) along the first axis (X), or the second axis (Y), or the third axis (Z), or the fourth axis (θ1), or the fifth axis (θ2), or the sixth axis (θ3), or a combination thereof. Depending on the chosen quality for enhancing the stereoscopic experience, the projector actuator (114) may be limited to a subset of the aforementioned six axes.

At step (408), the local controller (202) transmits the first stream of positions and the first video stream to the remote controller (252) (i.e., the remote videoconferencing booth). In this manner, the remote controller (252) can provide the first video stream on a corresponding remote screen. Additionally, the remote controller (252) can control connected components according to the first stream of positions.

Figure 5:
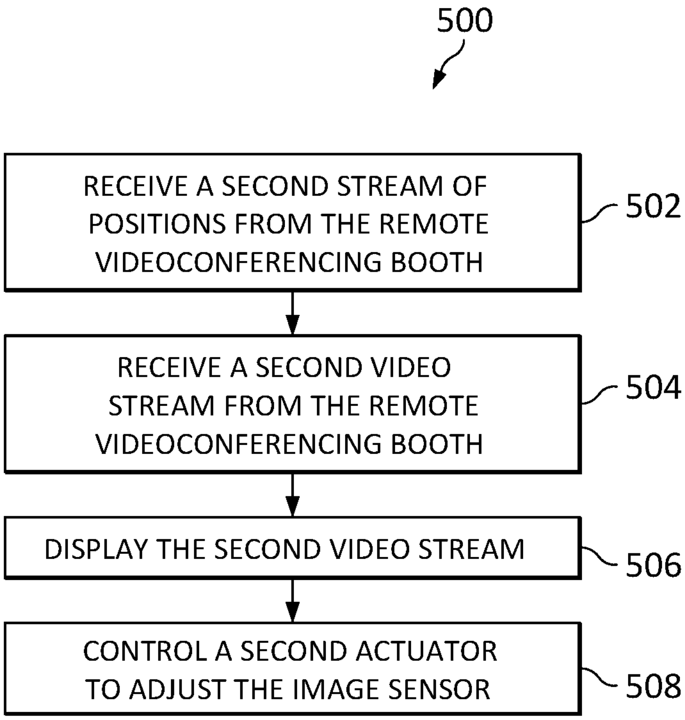
FIG. 5 depicts another example method conducted by the control system of FIG. 2.

While the local controller (202) transmits positions and video to the remote controller (252), the local controller (202) also receives positions and videos of a corresponding remote user using the remote videoconferencing booth from the remote controller (252). FIG. 5 provides a method (500) for controlling components of the videoconferencing booth (100) based on data associated with a remote participant. The method (500) may be performed by, for example, the local controller (202) or the remote controller (252). Additionally, the steps provided within FIG. 5 are merely examples, and may instead be conducted in a different order or simultaneously.

At step (502), the local controller (202) receives a second stream of positions from the remote videoconferencing booth. For example, as a remote user within the remote videoconferencing booth talks or otherwise moves their head and face during a videoconferencing meeting, the tracking system (106) associated with the remote controller (252) monitors the movement. The tracking system (106) provides the movement of the remote user to the remote controller (252). The remote controller (252) then transmits the movement of the remote user to the local controller (202) via the network (230).

At step (504), the local controller (202) receives a second video stream from the remote videoconferencing booth. For example, as the remote user participates in the videoconference, the image sensor arrangement (108) associated with the remote controller (252) captures the remote user via picture and/or video. The image sensor arrangement (108) provides the captured image and/or video to the remote controller (252). The remote controller (252) then transmits the captures image and/or video of the remote user to the local controller (202) via the network (230). At step (506), the local controller (202) displays the second video stream. For example, the image and/or video of the remote user is provided on the screen (124) using the projector (104).

At step (508), the local controller (202) controls a second actuator to adjust the image sensor arrangement (108). For example, as the head position of the remote user changes, the local controller (202) controls the sensor actuator (118) to adjust the position of the image sensor arrangement (108). The sensor actuator (118) may move the image sensor arrangement (108) along the first axis (X), the second axis (Y), the third axis (Z), the fourth axis (θ1), the fifth axis (θ2), the sixth axis (θ3), or a combination thereof.

Due to network latency, there may be delays from movement of the user (102) and the remote user relative to responsive movement of the projector actuator (114), the tracking actuator (116), and the sensor actuator (118). Such delays may create parallax errors for each viewer. In some embodiments, the local controller (202) may implement predictive algorithms to predict movement of the user (102) and adjust the various actuators accordingly to reduce parallax. In some implementations, the local controller (202) and the remote controller (252) implement a low-bandwidth and low-latency communication channel for conveying position information separately from the video stream.

Algorithms for latency compensation may include error estimation techniques between the received video stream's perspective and the ideal perspective based on the tracking data from the local tracking system (106). Because the local user (102) may move, it is possible that the received video stream may be captured from a perspective that differs from the local user's actual perspective at the time imagery is provided to the local user. To compensate for this possibility, error estimate techniques may be used to correct for differences between the received video stream's actual perspective (which is based on historical data from the local tracking system (106)) and the local user's actual and current perspective. For example, the local controller (202) receives both a video stream from the remote controller (252), and tracking information of the local user (102) from the tracking system (106). The local controller (202) estimates error between the two perspectives and uses the error to shift (e.g., warp, or otherwise adjust) the received image into the correct average position. The image may be shifted by tilting or adjusting the projector (104) using the projector actuator (114). In some embodiments, the image is shifted by shifting the pixels within the video images projected by the projector (104). Should the local user (102) stop moving, the positional error is zero and the projected image is re-centered with veridical parallax. In some implementations, the image sensor arrangement (108) captures a wider area than is projected to account for shifts in the projected image, avoiding boundary cropping.

In some instances, the videoconferencing booth (100) may be used for three-dimensional stereoscopic video viewing without the presence of a remote user. For example, the projector (104) projects a video having a left-eye image and a right-eye image. The tracking system (106) continues to monitor movement of the user (102) as they view the three-dimensional stereoscopic video. The local controller (202) controls the position of the projector (104) based on movement of the user (102) by actuating the projector actuator (114). In such an embodiment, the image sensor arrangement (108) (and the corresponding sensor actuator (118)) may be disabled or omitted, as data may not be transmitted to a remote controller (252). Additionally, in such an embodiment, one direction of the video pipeline (e.g., one direction of communication between the local controller (202) and the remote controller (252)) may be disabled or omitted.

In some implementations, rather than using a stereoscopic projector and a retroreflective screen, a 3-D auto-stereo monitor may be implemented. The position of the image sensor arrangement (108) is still controlled by the sensor actuator (118) to track the position of the local user (102). An output of the 3-D auto-stereo monitor may be adjusted based on the position of the local user (102) provided by the image sensor arrangement (108). In such an implementation, the projector (104), the mirror (120), and the splitter (122) may be omitted.

In some instances, the output of the projector (104) may be strobed such that the output of the projector (104) does not interfere with the operation of the image sensor arrangement (108). As an example, the image sensor arrangement (108) may only sense incident light when the projector (104) is not providing an output. In some embodiments, the image sensor arrangement (108) may include shutters that are closed when the projector (104) is emitting light (i.e., in an on-phase of a duty cycle) but may be open when the projector (104) is not emitting light (i.e., in an off-phase of a duty cycle). In some embodiments, pixels within the image sensor arrangement (108) may be reset after the projector (104) emits first light and then collect light in the time period before the projector (104) emits second light. With arrangements of this type, a duty cycle or a frequency of the strobing may be selected such that the output of the projector (104) is mostly or completely unaligned with the operation of the image sensor arrangement (108).

Additional Videoconferencing Configurations

Figure 6:
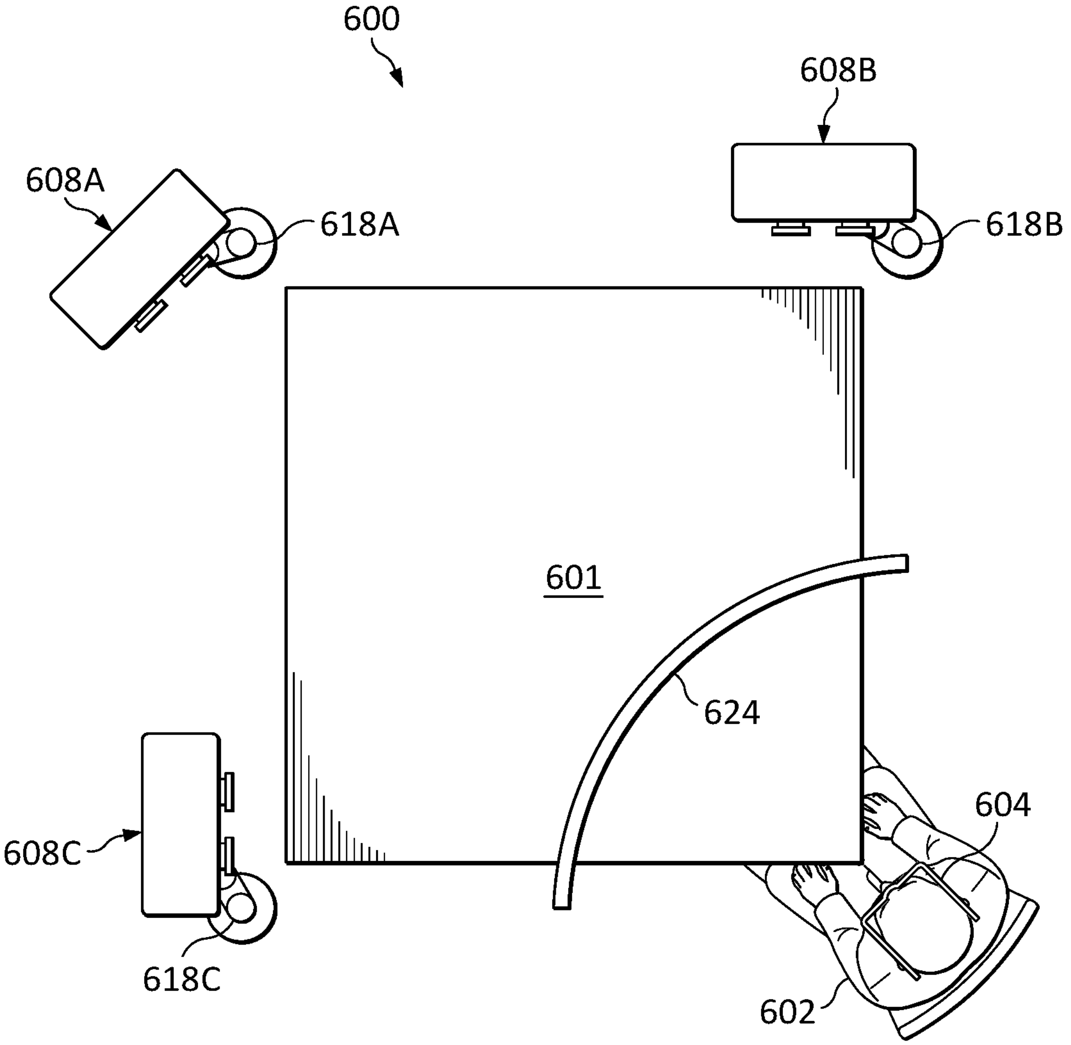
FIG. 6 depicts another example videoconferencing booth.

FIG. 6 illustrates another example videoconferencing booth (600). The videoconferencing booth (600) includes a local user (602) and a plurality of image sensor arrangements (608), namely n image sensors arrangements, each image sensor arrangement (608) associated with a corresponding remote user. The $n^{th}$ image sensor arrangement of the n image sensors arrangements comprises a first image sensor of the $n^{th}$ image sensor arrangement and a second image sensor of the $n^{th}$ image sensor arrangement. The first image sensor of the $n^{th}$ image sensor arrangement is configured to generate a video stream corresponding to a left eye of the $n^{th}$ remote user and the second image sensor of the $n^{th}$ image sensor arrangement is configured to generate a video stream corresponding to a right eye of the $n^{th}$ remote user. The example of FIG. 6 includes a first image sensor arrangement (608A), a second image sensor arrangement (608B), and a third image sensor arrangement (608C) associated with a first remote user, a second remote user, and a third remote user, respectively. Each remote user is situated in a respective remote videoconferencing booth. While FIG. 6 provides for three remote users, the number of the plurality of image sensor arrangements (608) may be reduced (for example, to two image sensor arrangements (608)) or increased (for example, to five image sensor arrangements (608)) for the desired number of remote participants. Additionally, the position of the local user (602) may vary in other instances. For example, when five remote users are involved, a first image sensor arrangement may be located to the left of the local user (602), a second image sensor arrangement may be located to the diagonal left of the local user (602), a third image sensor arrangement may be located in front of the local user (602), a fourth image sensor arrangement may be located to the diagonal right of the local user (602), and a fifth image sensor arrangement may be located to the right of the local user (602).

The local user (602) and the plurality of image sensor arrangements (608) may surround a table (610). The local user (602) is situated in front of a retro-reflective screen (624). The local user (602) may wear a wearable stereoscopic projector (604) configured to project images onto the screen (624). Particularly, as one example, the wearable stereoscopic projector (604) projects a left-eye image and a right-eye image onto the screen (624). The screen (624) reflects the left-eye image onto the left eye of the local user (602) and reflects the right-eye image onto the right eye of the local user (602). As retro-reflective screens reflect light in the direction it is received, projections from the wearable stereoscopic projector (604) are directed into the eyes of the local user (602) regardless of a gaze direction of the local user (602). The screen (624) is configured such that the local user (602) does not view the plurality of image sensor arrangements (608). Additionally, the screen (624) may be configured as a one-directional screen such that the plurality of image sensor arrangements (608) are able to capture image and video of the local user (602). For example, in some instances, the screen (624) includes perforations, allowing the plurality of image sensor arrangements (608) to view through the screen (624).

In some examples, the output of the wearable stereoscopic projector (604) may be strobed such that the output of the projector (604) does not interfere with the operation of the plurality of image sensor arrangements (608). As an example, the plurality of image sensor arrangements (608) may only sense incident light when the wearable stereoscopic projector (604) is not providing an output. In some embodiments, the plurality of image sensor arrangements (608) may include shutters that are closed when the wearable stereoscopic projector (604) is emitting light (i.e., in an on-phase of a duty cycle) but may open when the wearable stereoscopic projector (604) is not emitting light (i.e., in an off-phase of a duty cycle). In some embodiments, pixels within the plurality of image sensor arrangements (608) may be reset after the wearable stereoscopic projector (604) emits first light and then collect light in the time period before the wearable stereoscopic projector (604) emits second light. With arrangements of this type, a duty cycle or a frequency of the strobing may be selected such that the output of the wearable stereoscopic projector (604) is mostly or completely unaligned with the operation of the plurality of image sensor arrangements (608).

In some other examples, the screen (624) may be transparent to a first polarization and reflective to a second polarization. In such examples, the wearable stereoscopic projector (604) may include a polarization filter such that the wearable stereoscopic projector (604) only emits light of the second polarization. If desired, one or more of the image sensor arrangements (608) may include a polarization filter to block light of the second polarization.

Additionally, the videoconferencing booth (600) includes a tracking system (not shown) that tracks head and facial movement of the local user (602). In some instances, the tracking system is an infrared or near-infrared tracking system. In such an instance, a light source may be implemented and projected onto the local user (602) to aid in depth determination. In one example, the infrared tracking system uses markers, such as reflective markers coupled to the local user (602), to track movement of the local user (602). In another example, the tracking system is configured to track movement of the local user (602) using eye tracking algorithms, facial tracking algorithms, and other algorithms which may be machine-learned algorithms. In a further example, the tracking system is embedded on or within the wearable stereoscopic projector (604). For example, one or more movement sensors (and/or orientation sensors) may be situated within the wearable stereoscopic projector (604) to track positions of the head of the local user (602). As the head orientation of the local user (602) changes, the movement and/or orientation sensors detect the movement and/or orientation of the head of the local user (602). The wearable stereoscopic projector (604) transmits signals indicative of the orientation to each connected remote videoconferencing booth. If desired, the tracking system may use imagery from one or more of the image sensor arrangements (608), optionally together with information on the positions of the plurality of sensor actuators (618) (described below), to track the head and facial movement of the local user (602).

Each of the plurality of image sensor arrangements (608) are situated on a sensor actuator (618). For example, the first image sensor arrangement (608A) is situated on a first sensor actuator (618A), the second image sensor arrangement (608B) is situated on a second sensor actuator (618B), and the third image sensor arrangement (608C) is situated on a third sensor actuator (618C). Each image sensor arrangement (608) is associated with a remote user in a remote videoconferencing booth. For example, as previously described with respect to FIG. 2, a plurality of remote booth controllers (252) may be connected to a local booth controller (202) over the network (230), at least one remote booth controller (252) for each remote user. Movement of each remote user is tracked by a respective tracking system. A local booth controller (such as the local booth controller (202) in FIG. 2) receives signals of indicative of movement of each remote user, and controls the sensor actuator (618) associated with the respective remote user to actuate the respective image sensor arrangement (608). In this manner, each image sensor arrangement (608) moves in conjunction with movement of the associated remote user, mimicking their movement and matching the orientation of the image sensor arrangement (608) with the orientation of the respective remote user.

Figure 7:
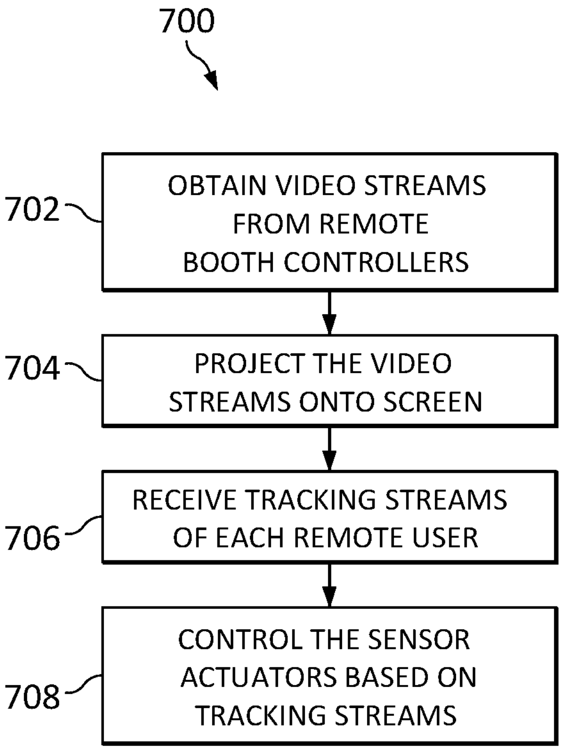
FIG. 7 depicts another example method conducted by the control system of FIG. 2.

FIG. 7 provides a method (700) for controlling components of the videoconferencing booth (600). The method (700) may be performed by, for example, the local booth controller (202) or the remote booth controller (252). Additionally, the steps provided within FIG. 7 are merely examples, and may instead be conducted in a different order or simultaneously.

At step (702), the local controller (202) obtains video streams from the remote booth controllers (252). For example, each image sensor arrangement (608) is associated with a particular user. The image sensor arrangement (608) transmits captured video to the respective user. The first image sensor arrangement (608A) transmits video of the local user (602) to a first remote booth controller, the second image sensor arrangement (608B) transmits video of the local user (602) to a second remote booth controller, and the third image sensor arrangement (608C) transmits video of the local user (602) to a third remote booth controller. The local controller (202) receives video streams from associated image sensor arrangements (608) in each remote videoconferencing booth to obtain video of each remote user.

At step (704), the local controller (202) projects, using the wearable stereoscopic projector (604), the video streams onto the screen (624). For example, the video streams showing each remote user may be combined into a single video stream (for example, a 180 degree video) and projected onto the screen (624). As the local user (602) turns their head or adjusts their gaze, the projected video is adjusted to show the respective remote user based on a detected viewing angle of the user (102). For example, when the local user (602) is facing the first remote user (e.g., the first image sensor arrangement (608A) in FIG. 6), the wearable stereoscopic projector (604) projects video corresponding from 45 degrees to 135 degrees of the 180 degree video. When the local user (602) is facing the second remote user (e.g., the second image sensor arrangement (608B) in FIG. 6), the wearable stereoscopic projector (604) projects video corresponding from 90 degrees to 180 degrees of the 180 degree video. When the local user (602) is facing the third remote user (e.g., the third image sensor arrangement (608C) in FIG. 6), the wearable stereoscopic projector (604) projects video corresponding from 0 degrees to 90 degrees of the 180 degree video. In such instances, the respective image sensor arrangements associated with the local user (602) may have a field of view (FOV) sufficiently large enough to capture all remote participants (for example, approximately 180 degrees or greater).

In another implementation, the wearable stereoscopic projector (604) projects a single video stream based on a viewing direction of the local user (602). For example, the local controller (202) may "stitch" together each video received from remote image sensor arrangements to create a single continuous image (e.g., three 60 degree videos combined to a single 180 degree video). When the local user (602) is facing the first remote user, the wearable stereoscopic projector (604) projects video received from a respective remote image sensor arrangement capturing the first remote user. When the local user (602) is facing the second remote user, the wearable stereoscopic projector (604) projects video received from a respective remote image sensor arrangement capturing the second remote user. When the local user (602) is facing the third remote user, the wearable stereoscopic projector (604) projects video received from a respective remote image sensor arrangement capturing the third remote user. Only a single remote user may be shown at a given time. In such instances, the respective image sensor arrangements associated with the local user (602) may have a FOV capable of only capturing a single remote user at a time (for example, approximately 60 degrees). Additionally, lens distortion in such implementations may favor the central region of the projected image while transmitting a lower angular-resolution image of the periphery (for example, greater than 40 degrees from the center of the projected image). To account for variance within each video from the remote image sensor arrangements, the local controller (202) may remove, replace, or otherwise alter the background of each video.

At step (706), the local controller (202) receives tracking streams of each remote user from each remote booth controller (252). For example, the tracking system associated with each remote user transmits signals indicative of movement of the respective remote users to the local controller (202). In some instances, the local controller (202) also transmits signals indicative of the local user (602) to each remote booth controller (252).

At step (708), the local controller (202) controls the plurality of sensor actuators (618) to actuate the plurality of image sensor arrangements (608) based on the received tracking streams. For example, the first sensor actuator (618A) is controlled based on movement of the first remote user, the second sensor actuator (618B) is controlled based on movement of the second remote user, and the third sensor actuator (618C) is controlled based on movement of the third remote user.

Similar to the example videoconferencing booth (100) of FIG. 1, the videoconferencing booth (600) may also experience delays due to network latency. Such delays may create parallax errors for each viewer. In some embodiments, the local controller (202) implements predictive algorithms to predict movement of the user (102) and ensure the correct video stream is projected by the wearable stereoscopic projector (604). For example, the local controller (202) may predict that the local user (602) is turning from facing the first image sensor arrangement (608A) to the second image sensor arrangement (608B). In some implementations, the local controller (202) may warp the projected video to account for such movement, thereby adjusting the perspective without waiting for new positional information to be transmitted to the respective remote sensor actuator (618) and before new frames of video are received and projected by the wearable stereoscopic projector (604).

Figure 8A:
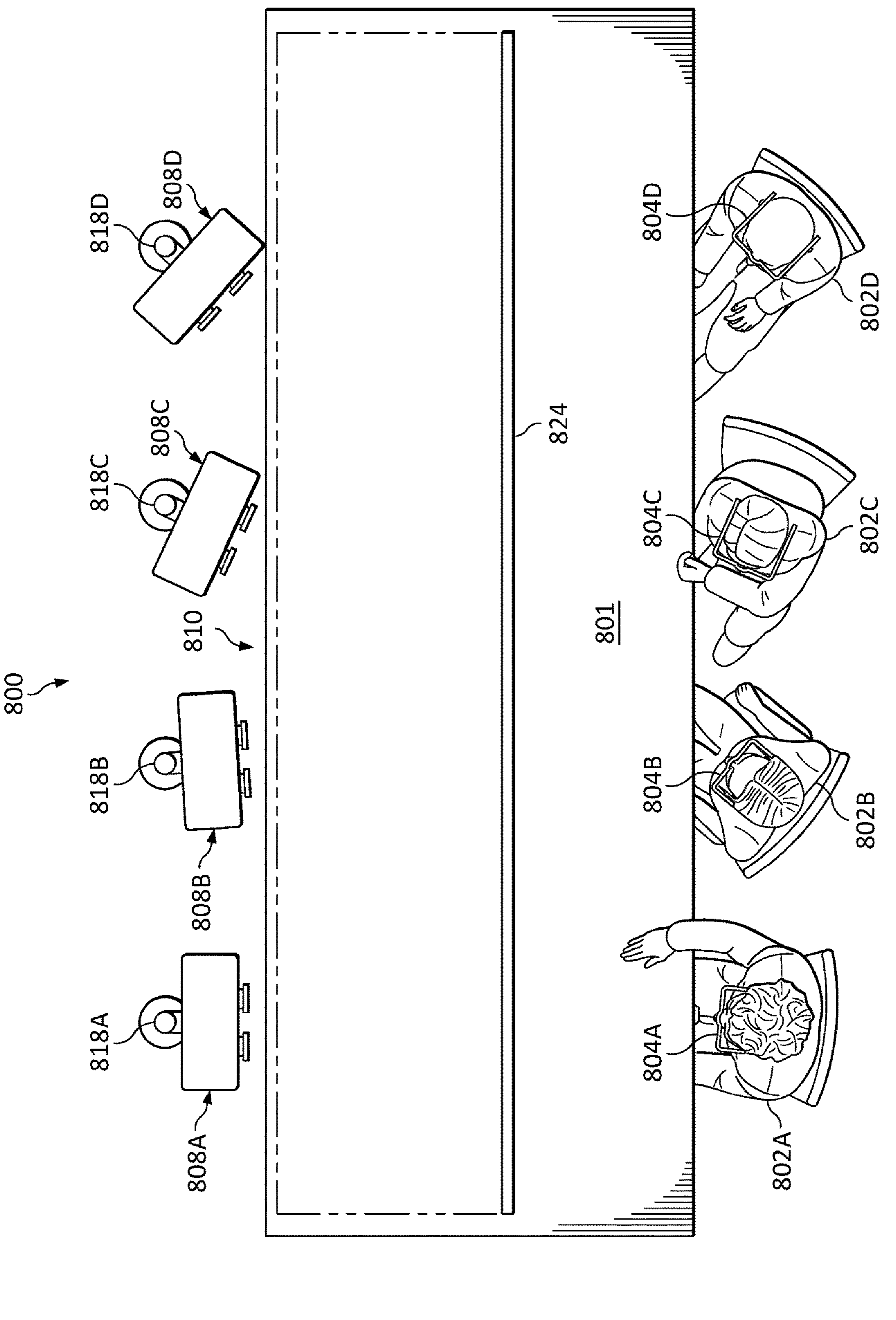
FIGS. 8A-8B depict an example videoconferencing table.
Figure 8B:
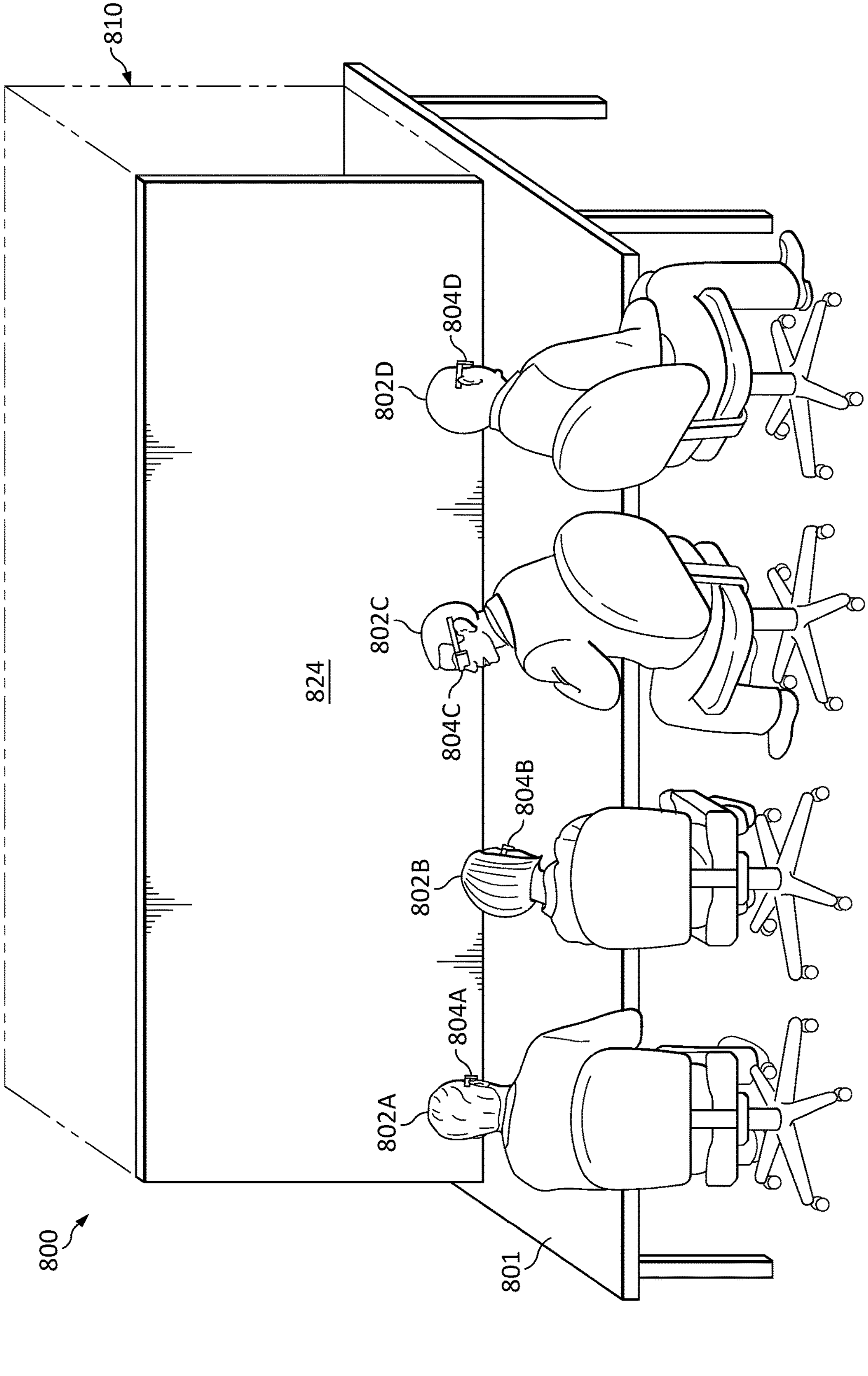

The embodiments of FIG. 1 and FIG. 6 provide for only a single local user. However, aspects described herein may be expanded to a videoconferencing table for a plurality of local users. For example, FIGS. 8A-8B illustrate an example videoconferencing room (800) having a plurality of local users (802) at a table (801). Each of the local users (802) has an associated wearable stereoscopic projector (804). In the example of FIGS. 8A-8B, the plurality of local users (802) includes a first local user (802A) having a first wearable stereoscopic projector (804A), a second local user (802B) having a second wearable stereoscopic projector (804B), a third local user (802C) having a third wearable stereoscopic projector (804C), and a fourth local user (802D) having a fourth wearable stereoscopic projector (804D). However, in some instances, fewer or more local users (802) may be situated at the table (801).

A plurality of image sensor arrangements (808) are situated across the table (801) from the plurality of local users (802) and behind a screen (824). Each image sensor arrangement (808) is situated on a respective sensor actuator (818). Similar to FIG. 1 and FIG. 6, each image sensor arrangement (808) is associated with a remote user participating in a videoconference. Accordingly, in the example of FIG. 8, eight people are participating in the videoconference: the plurality of local users (802), and a plurality of remote users represented by the plurality of image sensor arrangements (808). A remote videoconferencing table (not shown) includes a remote image sensor arrangement associated with each local user (802).

Each image sensor arrangement (808) captures a view associated with a remote user as the remote videoconferencing table. For example, the first image sensor arrangement (808A) captures a view of a first remote user, the second image sensor arrangement (808B) captures a view of a second remote user, the third image sensor arrangement (808C) captures a view of a third remote user, and the fourth image sensor arrangement (808D) captures a view of a fourth remote user. Each remote user wears a remote wearable stereoscopic projector (not shown). The movement of the remote user's head may be tracked (e.g., using the wearable projectors, using image sensor arrangements, using another head tracking system, etc.). The sensor actuators (818) are controlled to move each image sensor arrangement (808) and mimic or reflect the movement of their respective remote user. In the example of FIGS. 8A-8B, the second local user (802B) is a primary speaker. The second image sensor arrangement (808B), the third image sensor arrangement (808C) and the fourth image sensor arrangement (808D) are each focusing on (e.g., facing) the second local user (802B). The first image sensor arrangement (808A) has an independent focus, and is focusing on the first local user (802A).

In some implementations, the plurality of image sensor arrangements (808) are enclosed within a blind enclosure 810, hiding the plurality of image sensor arrangements (808) from the plurality of local users (802). Additionally, the screen (824) may be configured as a one-directional screen such that the plurality of image sensor arrangements (808) are able to capture image and video of the plurality of local users (802). For example, in some instances, the screen (824) includes perforations, allowing the plurality of image sensor arrangements (808) to view through the screen (824). As another example, the screen (824) may be reflective to a first polarization and transparent to a second polarization, while the wearable stereoscopic projectors (804) are fitted with a first polarization filter to emit only light of the first polarization and the plurality of image sensor arrangements (808) are optionally fitted with a second polarization filter to receive only light of the second polarization.

In various examples, the outputs of the wearable stereoscopic projectors (802) may be strobed together such that their outputs do not interfere with the operation of the plurality of image sensor arrangements (808). The outputs of the wearable stereoscopic projectors (804) may be strobed such that the outputs of the wearable stereoscopic projectors (804) do not interfere with the operation of the plurality of image sensor arrangements (808).

As an example, the plurality of image sensor arrangements (808) may only sense incident light when the wearable stereoscopic projectors (804) are not providing an output. In some embodiments, the plurality of image sensor arrangements (808) may include shutters that are closed when the wearable stereoscopic projectors (804) are emitting light (i.e., in an off-phase of a duty cycle) but may be open when the wearable stereoscopic projectors (804) are not emitting light (i.e., in an off-phase of a duty cycle). In some embodiments, pixels within the plurality of image sensor arrangements (808) may be reset after the wearable stereoscopic projectors (804) emit first light and then collect light in the time period before the wearable stereoscopic projectors (804) emit second light. With arrangements of this type, a duty cycle or a frequency of the strobing may be selected such that the outputs of the wearable stereoscopic projectors (804) are mostly or completely unaligned with the operation of the plurality of image sensor arrangements (808).

Similarly, remote image sensor arrangements capture views of a remote videoconferencing table for each of the local users (802). Each wearable stereoscopic projector (804) projects a view of the remote image sensor arrangement associated with the respective local user (802). Due to the retro-reflective nature of the screen (824), projections from the wearable stereoscopic projectors (804) are seen only by the respective local user (802). For example, projections from the first wearable stereoscopic projector (804A) are only viewable by the first local user (802A), projections from the second wearable stereoscopic projector (804B) are only viewable by the second local user (804B), and the like. In some instances, the wearable stereoscopic projectors (804) dim or turn off their projections when a local user (802) turns their gaze towards another local user (802). For example, when the second local user (802B) turns towards either the first local user (802A) or the third local user (802C), the second wearable stereoscopic projector (804B) adjusts the projection to either dim or turn off.

In some instances, the videoconferencing booth (100), the videoconferencing booth (600), and/or the videoconferencing table (800) may include an "observer" camera shared by inactive viewers of an ongoing videoconference. Such an observer camera may be located at a higher vantage and be immobile compared to active participants. In some instances, who is an "active" participant and who is an "inactive" participant may change dynamically based on participation within the videoconference (for example, who is talking or changing gaze direction).

Additional features of the videoconferencing booth (600) and the videoconferencing table (800) may be understood based on the configuration of the videoconferencing booth (100). For example, the videoconferencing booth (600) and the videoconferencing table (800) may include microphones and speakers (e.g., spatial audio devices) for conveying audio data. Embodiments of the videoconferencing booth (600) and the videoconferencing table (800) are not limited only to that shown in FIG. 6 and FIGS. 8A-8B, respectively.

The above systems and methods may provide for a videoconferencing booth. Systems, methods, and devices in accordance with the present disclosure may take any one or more of the following configurations.

(1) A videoconferencing booth, comprising: a tracking system configured to track a position of a first user; a stereoscopic projector; a first actuator configured to translate the stereoscopic projector along at least a first axis; an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth; a second actuator configured to translate the image sensor arrangement along at least a second axis; and a controller configured to: obtain a first stream of first positions of the first user from the tracking system, transmit commands to the first actuator to adjust the position of the stereoscopic projector along the first axis based on the first stream of first positions of the first user, transmit the first stream of first positions of the first user to the remote videoconferencing booth, receive, from the remote videoconferencing booth, a second stream of second positions of the second user of the remote videoconferencing booth, and transmit commands to the second actuator to adjust the position of the image sensor arrangement along the second axis based on the second stream of second positions of the second user.

(2) The videoconferencing booth according to (1), further comprising a retro-reflective screen, wherein the stereoscopic projector is configured to project a left-eye image and a right-eye image, wherein the controller is configured to transmit commands to adjust the position of the stereoscopic projector along at least the first axis such that the left-eye image from the projector is reflected by the retro-reflective screen towards the left-eye of the first user and that the right-eye image from the projector is reflected by the retro-reflective screen towards the right-eye of the first user.

(3) The videoconferencing booth according to (2), further comprising a polarizing beamsplitter configured to reflect light of a first polarization and transmit light of a second polarization, wherein the polarizing beamsplitter is positioned (A) such that light of the first polarization coming from the first user reflects off a first surface of the polarizing beamsplitter and is directed towards the image sensor arrangement, (B) such that light of the first polarization coming from the stereoscopic projector reflects off a second surface of the polarizing beamsplitter and is directed towards the retro-reflective screen, and (C) such that light of the second polarization coming from the retro-reflective screen is transmitted through the polarizing beamsplitter and towards the first user.

(4) The videoconferencing booth according to (3), wherein the retro-reflective screen comprises a quarter-wave plate such that light of the first polarization that reflects off the retro-reflective screen is converted into light of the second polarization.

(5) The videoconferencing booth according to any one of (3) to (4), further comprising at least one polarization filter configured to pass light of the first polarization and block light of the second polarization, wherein the at least one polarization filter comprises (1) a first polarization filter disposed in the optical path between the polarizing beamsplitter and the image sensor arrangement and/or (2) a second polarization filter disposed in the optical path between the polarizing beamsplitter and the stereoscopic projector.

(6) The videoconferencing booth according to any one of (1) to (5), wherein the tracking system includes a head tracking system configured to track a head position of the first user.

(7) The videoconferencing booth according to any one of (1) to (6), wherein the tracking system includes a face tracking system configured to track a face position of the first user.

(8) The videoconferencing booth according to any one of (1) to (7), wherein the at least the first axis includes three axes, and wherein the at least the second axis includes three axes.

(9) The videoconferencing booth according to any one of (1) to (8), further comprising a spatial audio device configured to project sound provided by the remote videoconferencing booth.

(10) The videoconferencing booth according to any one of (1) to (9), wherein the stereoscopic projector has a duty cycle with on-phases and off-phases, wherein the stereoscopic projector is configured to project light during the on-phases, but not the off-phases, of the duty cycle of the stereoscopic projector, and wherein the image sensor arrangement is configured to capture images of the first user during the off-phases of the duty cycle of the stereoscopic projector.

(11) The videoconferencing booth according to any one of (1) to (10), wherein the controller is further configured to: receive, from the remote videoconferencing booth, a video stream of the second user, wherein the video stream of the second user includes at least a given frame that was captured based on the first user being at a third position, determine, based at least in part on the first stream of first positions of the first user from the tracking system, that the first user is located at a fourth position at the time of receiving the given frame of the video stream, estimate an error between the third position of the first user and the fourth position of the first user, and adjust the video stream of the second user based on the estimated error.

(12) The videoconferencing booth according to any one of (1) to (11), wherein the controller is further configured to: obtain a third stream of third positions of a third user from the tracking system, transmit commands to the first actuator to adjust the position of the stereoscopic projector along the first axis based on the first stream of first positions of the first user and the third stream of third positions of the third user, and transmit the first stream of first positions of the first user and the third stream of third positions of the third user to a remote videoconferencing booth.

(13) The videoconferencing booth according to any one of (1) to (12), further including: a second image sensor; and a third actuator configured to translate the second image sensor along at least a third axis; wherein the controller is further configured to: transmit the first stream of first positions of the first user to a second remote videoconferencing booth, receive, from the second remote videoconferencing booth, a third stream of third positions of a third user of the second remote videoconferencing booth, and transmit commands to the third actuator to adjust the position of the second image sensor along the third axis based on the third stream of third positions of the third user.

(14) A method for operating a videoconferencing booth, the videoconferencing booth including a tracking system configured to track a position of a first user, a stereoscopic projector, a first actuator configured to translate the stereoscopic projector along at least a first axis, an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth, and a second actuator configured to translate the image sensor arrangement along at least a second axis, the method comprising: obtaining a first stream of first positions of the first user from the tracking system, transmitting commands to the first actuator to adjust the position of the stereoscopic projector along the first axis based on the first stream of first positions of the first user, transmitting the first stream of first positions of the first user to the remote videoconferencing booth, receiving, from the remote videoconferencing booth, a second stream of second positions of the second user of the remote videoconferencing booth, and transmitting commands to the second actuator to adjust the position of the image sensor arrangement along the second axis based on the second stream of second positions of the second user.

(15) The method according to (14), wherein the videoconferencing booth includes a retro-reflective screen, and wherein the method further includes: projecting, with the stereoscopic projector, a left-eye image and a right-eye image, and transmitting commands to adjust the position of the stereoscopic projector along at least the first axis such that the left-eye image from the projector is reflected by the retro-reflective screen towards the left-eye of the first user and that the right-eye image from the projector is reflected by the retro-reflective screen towards the right-eye of the first user.

(16) The method according to (15), further comprising: reflecting, with a polarizing beamsplitter, light of a first polarization, and transmitting, with the polarizing beamsplitter, light of a second polarization, wherein the polarizing beamsplitter is positioned (A) such that light of the first polarization coming from the first user reflects off a first surface of the polarizing beamsplitter and is directed towards the image sensor arrangement, (B) such that light of the first polarization coming from the stereoscopic projector reflects off a second surface of the polarizing beamsplitter and is directed towards the retro-reflective screen, and (C) such that light of the second polarization coming from the retro-reflective screen is transmitted through the polarizing beamsplitter and towards the first user.

(17) The method according to (16), wherein the retro-reflective screen comprises a quarter-wave plate such that light of the first polarization that reflects off the retro-reflective screen is converted into light of the second polarization.

(18) The method according to any one of (16) to (17), wherein the videoconferencing booth includes at least one polarization filter configured to pass light of the first polarization and block light of the second polarization, wherein the at least one polarization filter comprises (1) a first polarization filter disposed in the optical path between the polarizing beamsplitter and the image sensor arrangement and/or (2) a second polarization filter disposed in the optical path between the polarizing beamsplitter and the stereoscopic projector.

(19) The method according to any one of (14) to (18), further comprising: tracking, with the tracking system, a head position of the first user.

(20) The method according to any one of (14) to (19), further comprising: tracking, with the tracking system, a face position of the first user.

(21) The method according to any one of (14) to (20), further comprising: projecting, with a spatial audio device, sound provided by the remote videoconferencing booth.

(22) The method according to any one of (14) to (21), wherein the stereoscopic projector has a duty cycle with on-phases and off-phases, the method further comprising: with the stereoscopic projector, projecting light during the on-phases, but not the off-phases, of the duty cycle of the stereoscopic projector; and with the image sensor arrangement, capturing images of the first user during the off-phases of the duty cycle of the stereoscopic projector.

(23) The method according to any one of (14) to (22), further comprising: receiving, from the remote videoconferencing booth, a video stream of the second user, wherein the video stream of the second user includes at least a given frame that was captured based on the first user being at a third position, determining, based at least in part on the first stream of first positions of the first user from the tracking system, that the first user is located at a fourth position at the time of receiving the given frame of the video stream, estimating an error between the third position of the first user and the fourth position of the first user, and adjusting the video stream of the second user based on the estimated error.

(24) The method according to any one of (14) to (23), further comprising: obtaining a third stream of third positions of a third user from the tracking system, transmitting commands to the first actuator to adjust the position of the stereoscopic projector along the first axis based on the first stream of first positions of the first user and the third stream of third positions of the third user, and transmitting the first stream of first positions of the first user and the third stream of third positions of the third user to a remote videoconferencing booth.

(25) The method according to any one of (14) to (24), wherein the videoconferencing booth includes a second image sensor arrangement and a third actuator configured to translate the second image sensor arrangement along at least a third axis, and wherein the method further comprises: transmitting the first stream of first positions of the first user to a second remote videoconferencing booth, receiving, from the second remote videoconferencing booth, a third stream of third positions of a third user of the second remote videoconferencing booth, and transmitting commands to the third actuator to adjust the position of the second image sensor arrangement along the third axis based on the third stream of third positions of the third user.

(26) A non-transitory computer-readable medium storing instructions that, when executed by a processor of a projection system, cause the projection system to perform operations comprising the method according to any one of (14) to (25).

(27) A video booth comprising: a stereoscopic projector configured to project a first image and a second image, a polarizing beamsplitter configured to reflect light of a first polarization and transmit light of a second polarization, a retro-reflective screen, and a camera configured to monitor a user located within the videoconferencing booth, wherein the polarizing beamsplitter is positioned (A) such that light of the first polarization coming from the user situated within the videoconferencing booth reflects off a first surface of the polarizing beamsplitter and is directed towards the camera, (B) such that light of the first polarization coming from the stereoscopic projector reflects off a second surface of the polarizing beamsplitter and is directed towards the retro-reflective screen, and (C) such that light of the second polarization coming from the retro-reflective screen is transmitted through the polarizing beamsplitter and towards the user.

(28) A videoconferencing table, comprising: a tracking system configured to track positions of a first local user and a second local user; a first image sensor arrangement configured to capture at least the first local user; a second image sensor arrangement configured to capture at least the second local user; a first actuator configured to translate the first image sensor arrangement along at least a first axis; a second actuator configured to translate the second image sensor arrangement along at least a second axis; and a controller configured to: receive a first stream of first positions of a first remote user, transmit commands to the first actuator to adjust the position of the first image sensor arrangement along the first axis based on the first stream of first positions of the first remote user, receive a second stream of second positions of a second remote user, and transmit commands to the second actuator to adjust the position of the second image sensor arrangement along the second axis based on the second stream of second positions of the second remote user.

(29) The videoconferencing table according to (28), further comprising: a retro-reflective screen; and a first wearable stereoscopic projector configured to project a left-eye image and a right-eye image, wherein the first wearable stereoscopic projector projects the left-eye image and the right-eye image such that the left-eye image is reflected by the retro-reflective screen towards the left eye of the first local user and that the right-eye image is reflected by the retro-reflective screen towards the right eye of the first local user.

(30) The videoconferencing table according to (29), wherein the tracking system includes a movement sensor embedded within the first wearable stereoscopic projector configured to track positions of the head of the first local user.

(31) The videoconferencing table according to (30), wherein the controller is configured to: detect, based on signals from the movement sensor, movement of the head of the first local user towards the second local user, and dim, in response to the movement, the left-eye image and the right-eye image projected by the first wearable stereoscopic projector.

(32) The videoconferencing table according to any one of (29) to (31), wherein the first wearable stereoscopic projector includes glasses frames, a left-eye projector on a first side of the glasses frames, and a right-eye projector on a second side of the glasses frames.

(33) The videoconferencing table according to any one of (29) to (32), wherein the first wearable stereoscopic projector has a duty cycle with on-phases and off-phases, wherein the first wearable stereoscopic projector is configured to project light during the on-phases, but not the off-phases, of the duty cycle of the first wearable stereoscopic projector, and wherein the first image sensor arrangement is configured to capture images of the first local user during the off-phases of the duty cycle of the first wearable stereoscopic projector.

(34) The videoconferencing table according to (33), further comprising a second wearable stereoscopic projector having a duty cycle with on-phases and off-phases, wherein the second wearable stereoscopic projector is configured to project light during the on-phases, but not the off-phases, of the duty cycle of the second wearable stereoscopic projector, and wherein the second image sensor arrangement is configured to capture images of the second local user during the off-phases of the duty cycle of the second wearable stereoscopic projector.

(35) The videoconferencing table according to any one of (29) to (34), wherein the retro-reflective screen is configured to reflect light of a first polarization and pass light of a second polarization, and wherein the first wearable stereoscopic projector includes a first polarization filter to emit light only of the first polarization, and wherein the first image sensor arrangement and the second image sensor arrangement each include a second polarization filter to receive light only of the second polarization.

(36) The videoconferencing table according to any one of (28) to (35), wherein the at least the first axis includes three axes, and wherein the at least the second axis includes three axes.

(37) A method for operating a videoconferencing table, the videoconferencing table including a tracking system configured to track positions of a first local user and a second local user, a first image sensor arrangement configured to capture at least the first local user, a second image sensor arrangement configured to capture at least the second local user, a first actuator configured to translate the first image sensor arrangement along at least a first axis, and a second actuator configured to translate the second image sensor arrangement along at least a second axis, the method comprising: receiving a first stream of first positions of a first remote user, transmitting commands to the first actuator to adjust the position of the first image sensor arrangement along the first axis based on the first stream of first positions of the first remote user, receiving a second stream of second positions of a second remote user, and transmitting commands to the second actuator to adjust the position of the second image sensor arrangement along the second axis based on the second stream of second positions of the second remote user.

(38) The method according to (37), wherein the videoconferencing table further includes a retro-reflective screen and a first wearable stereoscopic projector, and wherein the method further comprises: projecting, with the first wearable stereoscopic projector, a left-eye image such that the left-eye image is reflected by the retro-reflective screen towards a left eye of the first local user, and projecting, with the first wearable stereoscopic projector, a right-eye image such that the right-eye image is reflected by the retro-reflective screen towards a right eye of the first local user.

(39) The method according to (38), further comprising: tracking, with a movement sensor embedded within the first wearable stereoscopic projector, positions of the first local user.

(40) The method according to (39), further comprising: detecting, based on signals from the movement sensor, movement of the head of the first local user towards the second local user, and dimming, in response to the movement and with the first wearable stereoscopic projector, the left-eye image and the right-eye image projected by the first wearable stereoscopic projector.

(41) The method according to any one of (38) to (40), wherein the wearable stereoscopic projector includes glasses frames, a left-eye projector on a first side of the glasses frames, and a right-eye projector on a second side of the glasses frames.

(42) The method according to any one of (38) to (41), wherein the first wearable stereoscopic projector has a duty cycle with on-phases and off-phases, the method further comprising: with the first wearable stereoscopic projector, projecting light during the on-phases, but not the off-phases, of the duty cycle of the first wearable stereoscopic projector, and with the first image sensor arrangement, capturing images of the first local user during the off-phases of the duty cycle of the second wearable stereoscopic projector.

(43) The method according to (42), wherein the videoconferencing table further includes a second wearable stereoscopic projector having a duty cycle with on-phases and off-phases, the method further comprising: with the second wearable stereoscopic projector, projecting light during the on-phases, but not the off-phases, of the duty cycle of the second wearable stereoscopic projector, and with the second image sensor arrangement, capturing images of the second local user during the off-phases of the duty cycle of the second wearable stereoscopic projector.

(44) The method according to any one of (38) to (43), further comprising: reflecting, with the retro-reflective screen, only light of a first polarization, passing, with the retro-reflective screen, only light of a second polarization, emitting, with the first wearable stereoscopic projector, only light of the first polarization, and receiving, with the first image sensor arrangement and the second image sensor arrangement, only light of the second polarization.

(45) The method according to any one of (37) to (44), wherein the at least the first axis includes three axes, and wherein the at least the second axis includes three axes.

(46) A videoconferencing booth, comprising: a tracking system configured to track a position of a first user; a wearable stereoscopic projector; an image sensor arrangement; an actuator configured to translate the image sensor arrangement along at least a first axis; and a controller configured to: obtain a first stream of first positions of the first user from the tracking system, transmit the first stream of first positions of the first user to a remote videoconferencing booth, receive, from the remote videoconferencing booth, a second stream of second positions of a second user of the remote videoconferencing booth, and transmit commands to the actuator to adjust the position of the image sensor arrangement along the first axis based on the second stream of second positions of the second user.

(47) The videoconferencing booth according to (46), further comprising a retro-reflective screen, wherein the wearable stereoscopic projector is configured to project a left-eye image and a right-eye image such that the left-eye image from the wearable stereoscopic projector is reflected by the retro-reflective screen towards the left-eye of the first user and that the right-eye image from the wearable stereoscopic projector is reflected by the retro-reflective screen towards the right-eye of the first user.

(48) The videoconferencing booth according to any one of (46) to (47), wherein the tracking system is embedded within the wearable stereoscopic projector.

(49) The videoconferencing booth according to any one of (46) to (48), wherein the tracking system includes a head tracking system configured to track a head position of the first user.

(50) The videoconferencing booth according to any one of (46) to (49), wherein the controller is further configured to: receive, from the remote videoconferencing booth, a video stream of the second user, wherein the video stream of the second user includes at least a given frame that was captured based on the first user being at a third position, determine, based at least in part on the first stream of first positions of the first user from the tracking system, that the first user is located at a fourth position at the time of receiving the given frame of the video stream, estimate an error between the third position of the first user and the fourth position of the first use, and adjust the video stream of the second user based on the estimated error.

(51) The videoconferencing booth according to any one of (46) to (50), wherein the at least the first axis includes three axes, and wherein the at least the second axis includes three axes.

(52) The videoconferencing booth according to any one of (46) to (51), wherein the controller is further configured to: obtain a third stream of third positions of a third user from the tracking system, and transmit the first stream of first positions of the first user and the third stream of third positions of the third user to a remote videoconferencing booth.

(53) The videoconferencing booth according to any one of (46) to (52), wherein the wearable stereoscopic projector has a duty cycle with on-phases and off-phases, wherein the wearable stereoscopic projector is configured to project light during the on-phases, but not the off-phases, of the duty cycle of the wearable stereoscopic projector, and wherein the image sensor arrangement is configured to capture images of the first user during the off-phases of the duty cycle of the wearable stereoscopic projector.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary. As used herein, “and/or” indicates that one, more than one, or all of the cases may occur.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A videoconferencing booth, comprising:

a tracking system configured to track a position of a first user;

a stereoscopic projector;

a first actuator configured to translate the stereoscopic projector along at least a first axis;

an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth;

a second actuator configured to translate the image sensor arrangement along at least a second axis; and a controller configured to:

obtain a first stream of first positions of the first user from the tracking system, transmit commands to the first actuator to adjust the position of the stereoscopic projector along the first axis based on the first stream of first positions of the first user, transmit the first stream of first positions of the first user to the remote videoconferencing booth, receive, from the remote videoconferencing booth, a second stream of second positions of the second user of the remote videoconferencing booth, transmit commands to the second actuator to adjust the position of the image sensor arrangement along the second axis based on the second stream of second positions of the second user, receive, from the remote videoconferencing booth, a video stream of the second user, wherein the video stream of the second user includes at least a given frame that was captured based on the first user being at a third position, determine, based at least in part on the first stream of first positions of the first user from the tracking system, that the first user is located at a fourth position at the time of receiving the given frame of the video stream, estimate an error between the third position of the first user and the fourth position of the first user, and adjust the video stream of the second user based on the estimated error.

2. The videoconferencing booth of claim 1, further comprising a retro-reflective screen, wherein the stereoscopic projector is configured to project a left-eye image and a right-eye image, wherein the controller is configured to transmit commands to adjust the position of the stereoscopic projector along at least the first axis such that the left-eye image from the projector is reflected by the retro-reflective screen towards the left-eye of the first user and that the right-eye image from the projector is reflected by the retro-reflective screen towards the right-eye of the first user.

3. The videoconferencing booth of claim 1 or claim 2, further comprising a polarizing beamsplitter configured to reflect light of a first polarization and transmit light of a second polarization, wherein the polarizing beamsplitter is positioned (A) such that light of the first polarization coming from the first user reflects off a first surface of the polarizing beamsplitter and is directed towards the image sensor arrangement, (B) such that light of the first polarization coming from the stereoscopic projector reflects off a second surface of the polarizing beamsplitter and is directed towards the retro-reflective screen, and (C) such that light of the second polarization coming from the retro-reflective screen is transmitted through the polarizing beamsplitter and towards the first user.

4. The videoconferencing booth of claim 1, wherein the retro-reflective screen comprises a quarter-wave plate such that light of the first polarization that reflects off the retro-reflective screen is converted into light of the second polarization.

5. The videoconferencing booth of claim 1, further comprising at least one polarization filter configured to pass light of the first polarization and block light of the second polarization, wherein the at least one polarization filter comprises (1) a first polarization filter disposed in the optical path between the polarizing beamsplitter and the image sensor arrangement and/or (2) a second polarization filter disposed in the optical path between the polarizing beamsplitter and the stereoscopic projector.

6. The videoconferencing booth of claim 1, wherein the tracking system includes a head tracking system configured to track a head position of the first user.

7. The videoconferencing booth of claim 1, wherein the at least the first axis includes three axes, and wherein the at least the second axis includes three axes.

8. The videoconferencing booth of claim 1, wherein the stereoscopic projector has a duty cycle with on-phases and off-phases, wherein the stereoscopic projector is configured to project light during the on-phases, but not the off-phases, of the duty cycle of the stereoscopic projector, and wherein the image sensor arrangement is configured to capture images of the first user during the off-phases of the duty cycle of the stereoscopic projector.

9. The videoconferencing booth of claim 1, further including:

a second image sensor arrangement; and a third actuator configured to translate the second image sensor arrangement along at least a third axis, wherein the controller is further configured to:

transmit the first stream of first positions of the first user to a second remote videoconferencing booth, receive, from the second remote videoconferencing booth, a third stream of third positions of a third user of the second remote videoconferencing booth, and transmit commands to the third actuator to adjust the position of the second image sensor arrangement along the third axis based on the third stream of third positions of the third user.

10. A method for operating a videoconferencing booth, the videoconferencing booth including a tracking system configured to track a position of a first user, a stereoscopic projector, a first actuator configured to translate the stereoscopic projector along at least a first axis, an image sensor arrangement comprising a first image sensor configured to generate a video stream corresponding to a left eye of a second user of a remote videoconferencing booth and a second image sensor configured to generate a video stream corresponding to a right eye of the second user of the remote videoconferencing booth, and a second actuator configured to translate the image sensor arrangement along at least a second axis, the method comprising:

obtaining a first stream of first positions of the first user from the tracking system, transmitting commands to the first actuator to adjust the position of the stereoscopic projector along the first axis based on the first stream of first positions of the first user, transmitting the first stream of first positions of the first user to the remote videoconferencing booth, receiving, from the remote videoconferencing booth, a second stream of second positions of the second user of the remote videoconferencing booth, transmitting commands to the second actuator to adjust the position of the image sensor arrangement along the second axis based on the second stream of second positions of the second user, receiving, from the remote videoconferencing booth, a video stream of the second user, wherein the video stream of the second user includes at least a given frame that was captured based on the first user being at a third position, determining, based at least in part on the first stream of first positions of the first user from the tracking system, that the first user is located at a fourth position at the time of receiving the given frame of the video stream, estimating an error between the third position of the first user and the fourth position of the first user, and adjusting the video stream of the second user based on the estimated error.

11. The method of claim 10, wherein the videoconferencing booth includes a retro-reflective screen, and wherein the method further includes:

projecting, with the stereoscopic projector, a left-eye image and a right-eye image, and transmitting commands to adjust the position of the stereoscopic projector along at least the first axis such that the left-eye image from the projector is reflected by the retro-reflective screen towards the left-eye of the first user and that the right-eye image from the projector is reflected by the retro-reflective screen towards the right-eye of the first user.

12. The method of claim 10, further comprising:

reflecting, with a polarizing beamsplitter, light of a first polarization, and transmitting, with the polarizing beamsplitter, light of a second polarization, wherein the polarizing beamsplitter is positioned (A) such that light of the first polarization coming from the first user reflects off a first surface of the polarizing beamsplitter and is directed towards the image sensor, (B) such that light of the first polarization coming from the stereoscopic projector reflects off a second surface of the polarizing beamsplitter and is directed towards the retro-reflective screen, and (C) such that light of the second polarization coming from the retro-reflective screen is transmitted through the polarizing beamsplitter and towards the first user.

13. The method of claim 10, wherein the retro-reflective screen comprises a quarter-wave plate such that light of the first polarization that reflects off the retro-reflective screen is converted into light of the second polarization.

14. The method of any of claim 10, wherein the videoconferencing booth includes at least one polarization filter configured to pass light of the first polarization and block light of the second polarization, wherein the at least one polarization filter comprises (1) a first polarization filter disposed in the optical path between the polarizing beamsplitter and the image sensor and/or (2) a second polarization filter disposed in the optical path between the polarizing beamsplitter and the stereoscopic projector.

* * * * *